2,910,444

PREPARATION OF CHROMIA-COPPER OXIDE HYDROGELS

Robert H. Cramer, Woodbury, N.J., assignor to Socony Mobil Oil Company, Inc., a corporation of New York No Drawing. Application May 20, 1957
Serial No. 660,096

6 Claims. (Cl. 252—467)

This invention relates to an improved process for preparing hydrogels consisting essentially of chromia and copper oxide. More particularly, the present invention relates to a method for preparing true hydrogels consisting essentially of a major proportion of chromia and a minor proportion of copper oxide. The invention is specifically concerned with a method for preparing a cogelled catalytic composite of chromia and copper oxide.

The distinction between true hydrogels and gelatinous precipitates is important to an understanding of the objects of the invention. The prior art has frequently confused these terms, reference being often made to a gel or hydrogel when it is obvious that the product so misnamed is a gelatinous precipitate. Using silica as an outstanding example, a true hydrogel may be formed by adding water glass to acid in such concentrations and proportions that a clear hydrosol is formed, which thereafter congeals to a firm, resilient hydrogel containing all of the water of the hydrosol. If, on the other hand, acid is added to water glass, a gelatinous precipitate of silica separates out which may be readily separated from the principal portion of the aqueous medium by filtration. Whenever the precipitate formed is of a composite nature, that is, of two or more inorganic oxides, the product is inhomogeneous due to the fact that the metal oxides do not precipitate in the same ratio throughout the acid addition period. This lack of homogeneity has been shown to adversely affect the catalytic properties of inorganic oxide composites. Furthermore, the precipitates are structurally weak. These two major disadvantages are encountered whether or not the final product is wholly gelatinous or in the form of a hydrogel in which large amounts of precipitate are occluded.

The present invention is concerned with a method for preparing true hydrogels as distinguished from gelatinous precipitates on the basis of the above definition. In addition to chemical homogeneity and mechanical strength of true hydrogels, the latter may readily be prepared in the form of spheroidal particles by well known methods, for example, that described in U.S. 2,385,217. According to the process of that patent, a gelable hydrosol having an appreciable but preferably short gelation time is injected into a body of a water-immiscible liquid. The hydrosol separates in the water-immiscible liquid into a plurality of units which assume spheroidal shape. The hydrosol globules remain in the water-immiscible liquid until gelation occurs, whereupon they are removed, washed and dried. The dried product is in the form of hard, transparent to translucent beads similar in general appearance to glass beads but containing a tremendous number of extremely fine pores. The hard, smooth surfaces and spheroidal shape of these beads renders them very resistant to breakage and attrition losses.

The success of the bead gel technique depends upon the fact that gelation time of various inorganic oxide sols may be readily controlled. The gelation time is dependent upon concentration, temperature, and pH. Many inorganic oxides may form component parts of hydrogels under varying conditions and many of them may be formed into true hydrogels without substantial difficulty. However, the known techniques cannot be applied to form hydrogels containing a major proportion of chromia and a minor, but substantial, proportion of copper oxide.

Composites of chromia and copper oxide have heretofore been prepared. One method heretofore employed is that described in U.S. 2,512,653, which involves mixing cupric acetate with chromium trioxide in acetic acid, thermally decomposing the composite, extracting with an aqueous ammonium hydroxide-ammonium nitrate solution and then reducing at atmospheric pressure with hydrogen at about 400° C. As will be apparent, composites prepared by the foregoing method are gelatinous precipitates rather than true hydrogels. Moreover, the above-described method has the disadvantage of requiring an extraction step which is both time-consuming and expensive.

It is a primary object of the present invention to provide a process for preparing true hydrogels of chromia and copper oxide containing no substantial amounts of gelatinous precipitates. A further object of the invention is the preparation of hydrogels consisting essentially of a major proportion of chromia and a minor, but substantial proportion of copper oxide. A still further object of the invention is the provision of a direct, commercially attractive method for preparing a cogelled composite of chromia and copper oxide.

The above and other objects which will be apparent to those skilled in the art are achieved in accordance with the present invention. It has been discovered that, with the utilization of certain copper and chromium-containing reactants and the maintenance of hereinafter specified pH conditions during the reaction, a true chromia-copper oxide hydrogel is obtained. Broadly stated, the instant invention involves a method for preparing a hydrogel consisting essentially of chromia and copper oxide by mixing an aqueous solution of a water-soluble ammoniacal cupric salt with an aqueous solution of chromic acetate to yield a chromia-copper oxide hydrosol having a pH greater than about 10 and preferably in the range of 10 to 12, which, upon lapse of a suitable period of time and without the addition to or subtraction from the sol of any substance, sets to a true all-embracing hydrogel.

Setting times can be varied widely. However, for practical purposes, the hydrosol ordinarily should not require more than about 24 hours to set to a hydrogel. Desirably, the setting time is less than 2 hours and where production of the hydrogel in bead form is desired, the time of gelation should not exceed about 20 seconds. The hydrogel, after drying, is a lustrous black, glassy amorphous material.

In general, hydrogels containing, on a dry basis, 60 to 95 percent by weight of chromia and 5 to 40 percent by weight of copper oxide are suitably prepared by the process of this invention. It has been found that such hydrogels containing no substantial amount of gelatinous precipitate may be produced, providing the pH thereof is greater than 10 by admixing an aqueous solution of a water-soluble ammoniacal cupric salt generally having a pH of between about 7.5 and about 12 with an aqueous solution of chromic acetate previously contacted with an alkaline material to raise the pH thereof within the approximate range of 6.5 to 10 and thereafter permitting the resulting hydrosol to set to a hydrogel.

The compositions prepared by the method described herein, after drying, may be defined as chromia-copper oxide cogels or copper chromite ($CuO \cdot Cr_2O_3$) gels. Copper chromate catalysts are well known to selectively convert carboxyl groups to methylol groups. Copper chromite is a useful catalyst for hyrogenation, cyclization, alkylation, hydration, dehydrogenation, hydrogenolysis, carbonylation, and isomerization reactions and for the conversion of carboxylic acids to acid chlorides by reaction with polyhalogenated hydrocarbons. The hydrogels of this invention may be prepared for use as catalysts by gelling in vats or the like and then breaking up the gel. The gels may be used as broken fragments or as pellets prepared by molding or extruding. The method of the invention is particularly adaptable to the preparation of hydrogels in the form of spheroidal bead-like particles.

It is essential that the pH of the hydrosols prepared in accordance with the present process be greater than 10 and preferably in the range of 10 to 12. While the optimum pH under a given set of conditions depends on the total solids content and on the chromia content, it has been found that hydrosols prepared at a pH below 10 failed to congeal to the desired hydrogel but remained in the liquid sol stage even after an excessively long time of set.

The ammoniacal cupric salt employed is suitably prepared by contacting with dilute ammonium hydroxide a cupric salt which results in the formation of insoluble cupric hydroxide and thereafter adding ammonia in an amount just sufficient to dissolve the precipitate formed. Without being limited by theory, it is believed that the dissolution occurs through the formation of the cupric ammonium ion. The pH of the resulting ammoniacal cupric salt solution is generally, as indicated hereinabove, within the approximate range of 7.5 to 12. Representative, but non-limiting examples, of the ammoniacal cupric salts which may be utilized in formation of the instant copper chromite gels are ammoniacal cupric chloride, ammoniacal cupric bromide, ammoniacal cupric fluoride, ammoniacal cupric acetate, ammoniacal cupric sulfate and ammoniacal cupric nitrate.

The chromic acetate reactant employed is readily formed without introduction of undesirable extraneous materials by reducing sodium dichromate with glycolic acid in the presence of acetic acid as described in U.S. Patent No. 2,615,031, issued October 21, 1952, to William A. Stover. As heretofore recognized, chromic acetate is not a true chemical compound since the ratio of acetate to chromium ion is capable of being varied widely. Generally, the acetate to chromium ratio of the chromic acetate solutions employed in the present process will be between about 1 and about 3.6. The pH of such solutions, respectively, lies within the approximate range of 3 to 6. The chromic acetate reactant solution is treated, prior to contacting with the ammoniacal cupric salt solution, with a suitable alkaline compound to raise the pH thereof to within the approximate range of 6.5 to 10. Suitable alkaline compounds for such purpose include the water-soluble hydroxides and carbonates of ammonia and the alkali metals, i.e., $K_2CO_3$, KOH, LiOH, NaOH, $Na_2CO_3$, $(NH_4)_2CO_3$, $NH_4OH$, etc. It will be realized that the concentration and quantity of alkaline compound added to the chromic acetate solution is generally such as to bring the pH thereof to within the approximate range of 6.5 to 10 and that the necessary concentration and quantity of alkaline material will depend upon the particular compound employed as well as on the pH of chromic acetate solution being treated.

The following examples will serve to illustrate the process of the invention without limiting the same:

Example 1

Three solutions were prepared. Solution A consisted of 20 percent by weight of sodium hydroxide (NaOH) and 80 percent by weight of water, and had a specific gravity at room temperature of 1.22. Solution B, containing ammoniacal cupric chloride, consisted of 20 percent by weight of cupric chloride ($CuCl_2$), 11.7 percent by weight of ammonia ($NH_3$) and 68.3 percent by weight of water. This solution had a pH of 11.3 and a specific gravity at room temperature of 1.16. Solution C consisting of aqueous chromic acetate was characterized by an acetate to chromium mole ratio of 3, a pH of about 4.8, and contained 10.2 percent by weight of $Cr_2O_3$. This solution had a specific gravity at 60° F. of 1.235.

The three solutions were contacted as follows: 15 cc. of solution A were mixed with 25 cc. of solution C to raise the pH of the latter to about 9. The resulting mixture was then thoroughly mixed with 10 cc. of solution B to yield a hydrosol having a pH of 10.2. The hydrosol so obtained set in less than 10 seconds at a temperature of 80–90° F. to a hydrogel. The hydrogel was dried to a glassy solid on a steam bath. The composition of the resulting product, on a dry salt-free basis, was 30.3 percent by weight of copper oxide (CuO) and 69.7 percent by weight of chromia ($Cr_2O_3$).

Example 2

Solutions A, B, and C, as described in Example 1 were used.

The three solutions were contacted as follows: 25 cc. of solution A were mixed with 25 cc. of solution C to raise the pH of the latter to about 10. The resulting mixture was then thoroughly mixed with 5 cc. of solution B to yield a hydrosol having a pH of 11.3. The hydrosol so obtained set in less than 10 seconds at a temperature of 80–90° F. to a hydrogel. The hydrogel was dried to a glassy solid on a steam bath. The composition of the resulting product, on a dry salt-free basis, was 18.0 percent by weight of copper oxide (CuO) and 82.0 percent by weight of chromia ($Cr_2O_3$).

Example 3

Solutions A, B, and C, as described in Example 1, were used.

The three solutions were contacted as follows: 10 cc. of solution A were mixed with 25 cc. of solution C to raise the pH of the latter to about 8.5. The resulting mixture was then thoroughly mixed with 15 cc. of solution B to yield a hydrosol having a pH of 9.2. This sol having a calculated composition, on a dry salt-free basis, of 39.4 percent by weight copper oxide (CuO) and 60.6 percent by weight of chromia ($Cr_2O_3$), did not undergo gelation even after about 2 hours but remained in the liquid stage.

It will be seen from the foregoing that a hydrosol having a pH of less than 10 failed to congeal to the desired chromia-copper oxide hydrogel.

It is to be understood that the above description is merely illustrative of preferred embodiments of the invention, of which many variations may be made within the scope of the following claims by those skilled in the art without departing from the spirit thereof.

I claim:

1. A method for preparing a cogelled composite consisting essentially of a major proportion of chromia and a minor proportion of copper oxide, which comprises forming a hydrosol having a pH greater than about 10 and characterized by an inherent capacity to set to a hydrogel by intimately admixing an aqueous solution of a water-soluble ammoniacal cupric salt and an aqueous solution of chromic acetate, the pH of each of said solutions having been adjusted prior to contact thereof to afford after contact a hydrosol having a pH greater than about 10, retaining in said sol substantially all the constituents thereof until gelation occurs and drying the resulting chromia-copper oxide hydrogel.

2. A method for preparing a cogelled composite consisting essentially of a major proportion of chromia and a minor proportion of copper oxide, which comprises forming a hydrosol having a pH greater than about 10 and characterized by an inherent capacity to set to a hydrogel by admixing an aqueous solution of a water-soluble ammoniacal cupric salt having a pH within the approximate range of 7.5 to 12 with an aqueous solution of chromic acetate, the pH of which has been adjusted to within the approximate range of 6.5 to 10, retaining in said sol substantially all the constituents thereof until gelation occurs and drying the resulting chromia-copper oxide hydrogel.

3. A method for preparing a cogelled composite consisting essentially of 60 to 95 percent by weight of chromia and 5 to 40 percent by weight of copper oxide, which comprises forming a hydrosol having a pH within the approximate range of 10 to 12 and characterized by an inherent capacity to set to a hydrogel by admixing an aqueous solution of a water-soluble ammoniacal cupric salt having a pH within the approximate range of 7.5 to 12 with an aqueous solution of chromic acetate, the pH of which has been adjusted to within the approximate range of 6.5 to 10, retaining in said sol substantially all the constituents thereof until gelation occurs and drying the resulting chromia-copper oxide hydrogel.

4. A method for preparing a cogelled composite consisting essentially of a major proportion of chromia and a minor proportion of copper oxide, which comprises forming a hydrosol having a pH greater than about 10 and characterized by an inherent capacity to set to a hydrogel by admixing an aqueous solution of a water-soluble ammoniacal cupric halide having a pH within the approximate range of 7.5 to 12 with an aqueous solution of chromic acetate having an acetate to chromium ratio of between about 1 and about 3.6 and having the pH thereof adjusted to within the approximate range of 6.5 to 10 by prior addition thereto of an alkaline material, retaining in said sol substantially all the constituents thereof until gelation occurs and drying the resulting chromia-copper oxide hydrogel.

5. A method for preparing a cogelled composite consisting essentially of a major proportion of chromia and a minor proportion of copper oxide, which comprises forming a hydrosol having a pH within the approximate range of 10 to 12 and characterized by an inherent capacity to set to a hydrogel by admixing an aqueous solution of ammoniacal cupric chloride with an aqueous solution of chromic acetate, the pH of each of said solutions having been adjusted prior to contact to afford after contact a hydrosol having a pH of between about 10 and about 12, retaining in said sol substantially all the constituents thereof until gelation occurs and drying the resulting chromia-copper oxide hydrogel.

6. A method for preparing a cogelled composite consisting essentially of a major proportion of chromia and a minor proportion of copper oxide, which comprises forming a hydrosol having a pH greater than about 10 and characterized by an inherent capacity to set to a hydrogel by admixing an aqueous solution of ammoniacal cupric chloride having a pH within the approximate range of 7.5 to 12 with an aqueous solution of chromic acetate, the pH of which has been adjusted to within the approximate range of 6.5 to 10 by prior addition thereto of an alkali metal hydroxide, retaining in said sol substantially all the constituents thereof until gelation occurs and drying the resulting chromia-copper oxide hydrogel.

References Cited in the file of this patent

UNITED STATES PATENTS

| | | |
|---|---|---|
| 2,129,507 | Salzberg | Sept. 6, 1938 |
| 2,218,457 | Winaus | Oct. 15, 1940 |
| 2,512,653 | Kapecky | June 27, 1950 |
| 2,773,839 | Stover et al. | Dec. 11, 1956 |